(12) United States Patent
Dieudonné et al.

(10) Patent No.: US 8,835,554 B2
(45) Date of Patent: Sep. 16, 2014

(54) COMPOSITION FOR THE PRODUCTION OF BREATHABLE-WATERPROOF ELASTIC FILM

(75) Inventors: Marie Dieudonné, Chalette sur Loing (FR); Béatrice Deffrenne, Villiers Saint Paul (FR); Philippe Sonntag, Hericy (FR)

(73) Assignee: Hutchinson, Paris (FR)

( * ) Notice: Subject to any disclaimer, the term of this patent is extended or adjusted under 35 U.S.C. 154(b) by 1089 days.

(21) Appl. No.: 12/667,659

(22) PCT Filed: Jul. 4, 2008

(86) PCT No.: PCT/FR2008/000962
§ 371 (c)(1),
(2), (4) Date: Feb. 3, 2010

(87) PCT Pub. No.: WO2009/024679
PCT Pub. Date: Feb. 26, 2009

(65) Prior Publication Data
US 2010/0183859 A1    Jul. 22, 2010

(30) Foreign Application Priority Data
Jul. 5, 2007   (FR) ..................................... 07 04855

(51) Int. Cl.
*C08L 1/00* (2006.01)
*C08L 1/02* (2006.01)
*C08F 2/16* (2006.01)

(52) U.S. Cl.
CPC .... *C08L 1/02* (2013.01); *C08F 2/16* (2013.01)
USPC ............. 524/804; 524/844; 524/27; 524/732; 428/500; 428/532

(58) Field of Classification Search
CPC ..................................... C08L 1/02; C08F 2/16
USPC ............. 524/27, 732, 804, 844; 428/500, 532
See application file for complete search history.

(56) References Cited

U.S. PATENT DOCUMENTS

| | | | |
|---|---|---|---|
| 2,880,184 A * | 3/1959 | Groves et al. ................... | 524/46 |
| 4,187,342 A * | 2/1980 | Holst et al. ..................... | 442/417 |
| 4,590,227 A * | 5/1986 | Nakamura et al. ............ | 523/130 |
| 4,833,026 A * | 5/1989 | Kausch ........................ | 428/315.5 |
| 5,649,326 A * | 7/1997 | Richard et al. ................. | 2/161.7 |
| 5,985,955 A | 11/1999 | Bechara et al. | |
| 6,183,907 B1 | 2/2001 | Barusseau et al. | |
| 6,346,557 B1 * | 2/2002 | Argy et al. ..................... | 521/71 |
| 2004/0231027 A1 | 11/2004 | Lee | |
| 2005/0031884 A1 | 2/2005 | Koide et al. | |
| 2010/0183859 A1 * | 7/2010 | Dieudonne et al. .......... | 428/220 |

FOREIGN PATENT DOCUMENTS

| | | |
|---|---|---|
| EP | 0 574 160 | 12/1993 |
| EP | 0 712 618 | 5/1996 |
| EP | 0 921 133 | 6/1999 |
| GB | 1011561 | 12/1965 |
| JP | 2000-303225 | 10/2000 |

\* cited by examiner

*Primary Examiner* — Michael Pepitone
*Assistant Examiner* — Michael A Salvitti
(74) *Attorney, Agent, or Firm* — Morgan, Lewis & Bockius LLP

(57) ABSTRACT

Novel articles, in particular films, made from polymers, which are elastic, impermeable to water and permeable to water vapor. Said articles are made from a composition comprising a dispersion of an elastomer in an aqueous solvent, a hydrophilic compound and a cross-linking agent.

16 Claims, No Drawings

COMPOSITION FOR THE PRODUCTION OF BREATHABLE-WATERPROOF ELASTIC FILM

RELATED APPLICATIONS

The present application is a U.S. National Phase Application of International Application No. PCT/FR2008/000962 (filed Jul. 4, 2008), which claims priority to French Patent Application No. 0704855 (filed Jul. 5, 2007), all of which are hereby incorporated by reference in their entirety.

One subject of the present invention is novel articles, in particular films, based on polymers, which are elastic, impermeable to water and permeable to water vapor. Another subject of the invention is a process for the preparation thereof and uses thereof.

For various applications, such as sports clothing, rubber gloves, but also the membranes of fuel cells and ultrafiltration membranes, there is a need for films that are impermeable to water in the liquid state, but which are permeable to water vapor, especially in the case of articles of clothing, to prevent the accumulation of water vapor resulting from perspiration. The articles which have this double property are said to be waterproof/breathable.

Two processes currently exist for manufacturing waterproof/breathable films: coating and laminating of a membrane onto a woven fabric.

Coating consists in applying a coating directly onto the woven fabric, which blocks up the spaces between the yarns of the weaving to make the woven fabric impermeable. In order to preserve the breathability, it is necessary to make the coating microporous. For this, a paste is applied which, after "curing", reveals micropores via evaporation of the solvent. The majority of microporous coatings are based on polyurethanes. Examples of such films are illustrated in U.S. Pat. No. 4,774,131; U.S. Pat. No. 5,169,906; U.S. Pat. No. 5,204,403 and U.S. Pat. No. 5,461,122.

As regards the waterproof/breathable membranes, today all of them are supported, mainly on a textile material. This is especially because of the low mechanical properties of the known waterproof/breathable membranes. Indeed, they must be fine (5 to 50 microns) in order to retain good breathability properties. These waterproof/breathable membranes may be manufactured by various processes which are described in U.S. Pat. No. 4,833,026, U.S. Pat. No. 5,908,690 and EP-0 591 782.

The laminating of a waterproof/breathable membrane is carried out by laminating the membrane to one side of the woven fabric. There are two types of waterproof/breathable membranes: hydrophilic or microporous. A microporous membrane is constituted of micropores that allow the passage of water vapor but that block drops of water. The evacuation of moisture (perspiration) takes place via a physical action. Whereas in the hydrophilic membranes, the transfer of moisture takes place via a chemical phenomenon. The membrane absorbs the water vapor and discharges it to the outside. It is necessary, in this case, to prime the pump: the membrane must firstly soak up water in order to function. In both cases, it is the pressure difference that activates the evacuation of moisture. A microporous film has a tendency to evacuate the water vapor more quickly but no longer transfers the water in liquid form.

Although the films of the prior art have advantageous water impermeability and vapor permeability properties, they generally have two major defects: poor mechanical properties, and especially low abrasion resistance, and low elasticity.

Therefore, there remained a need for films that are impermeable to water (when it is in the liquid state), permeable to water vapor, which are self-supported, endowed with good mechanical properties, and especially a good abrasion resistance, and a high wear resistance and which have very good elastic properties. Finally, it is sought to develop waterproof/breathable films for which the cost is low enough to allow them to be used in a wide range of applications.

The purpose of the invention is to achieve these objectives. This was possible due to the development of a particular composition which is then used in a conventional process of application to a mold, or former.

The articles of the invention are obtained by application to a mold of at least one layer of a composition comprising:

(i) a dispersion in an aqueous solvent of at least one elastomer;

(ii) from 15 to 100% by weight relative to the weight of the elastomer of at least one hydrophilic compound chosen from: cellulose and cellulose derivatives;

(iii) from 2 to 50% by weight relative to the weight of the hydrophilic compound of at least one crosslinking agent of the hydrophilic compound;

(iv) optionally a catalyst, followed by a drying operation.

This composition constitutes a first subject of the invention.

The dispersion (also known as a latex) of elastomer used in the above process is constituted of at least one rubber polymer or elastomer, which may be crosslinkable and which may optionally already be partially crosslinked. The crosslinking system may be a system of sulfur vulcanization or else a crosslinking system based on a peroxide and optionally sulfur, or else the composition may be based on an elastomer comprising thermally crosslinkable groups or else an already crosslinked thermoplastic elastomer, such as TPE (thermoplastic elastomer). In the presence of carboxylic groups on the elastomer, it is possible to use crosslinking coagents which may be divalent ions (e.g.: $Zn^{2+}$).

The rubber polymer, also known as an elastomer, may be any natural rubber or synthetic elastomer. It is preferably chosen from the group constituted by natural rubbers, synthetic polyisoprenes, butadiene/acrylonitrile copolymers, butadiene/acrylonitrile/methacrylic acid terpolymers, polychloroprenes, isoprene/isobutylene copolymers, carboxylated or non-carboxylated styrene-butadiene copolymers, polyurethanes, ethylene/vinyl acetate copolymers, acrylics, fluoroelastomers and thermoplastic elastomers, such as styrene block copolymers, thermoplastic elastomers derived from polyolefins or thermoplastic polyurethanes.

The hydrophilic compound is chosen from cellulose and cellulose derivatives, whether they are water-soluble or not. According to this embodiment, the hydrophilic compound is advantageously chosen from cellulose ethers and esters, in particular: carboxymethyl cellulose (Na-CMC), carboxymethyl hydroxyethyl cellulose (Na-CMHEC), hydroxyethyl cellulose (HEC), hydroxypropyl cellulose (HPC), methyl cellulose (MC), methyl hydroxyethyl cellulose (MHEC) and methyl hydroxypropyl cellulose (MHPC). It may also be chosen from fibers, or fly or lint of cellulose, such as the wood fibers obtained by dry defibering of wood pulp (these fibers also being known as fluff).

Preferably, the hydrophilic compound is chosen from: carboxymethyl cellulose and hydroxyethyl cellulose.

The composition may also comprise one or more hydrophilic compounds such as:
- polyvinyl alcohol;
- aqueous hydrophilic polyurethanes which are suspensions of hydrophilic polyurethane, also known as cationic self-associating polyurethanes. These compounds are constituted of polyethylene glycol units connected by urethane groups and are endowed with hydrophobic end groups; and
- superabsorbants which are generally polymers or copolymers comprising acrylic or polyacrylic groups.

Among the superabsorbants that can be used in the invention, mention may be made of polymers and copolymers based on acrylate, such as sodium acrylates. They may be in the form of fibers or powders. Mention may also be made of superabsorbants of natural origin such as the fibers sold under the trade mark Lysorb®.

The crosslinker of the hydrophilic compound is chosen from the customary crosslinkers of cellulose and of cellulose derivatives such as: dimethyloldihydroxyethyleneurea (DMDHEU), N-methylolacrylamide (NMA), melamine-formol resins, urea-formol resins, polyamide-epichlorohydrin (PAE) resins, polycarboxylic acids such as citric acid, polymaleic acid, polyacrylic acid, 1,2,3,4-butanetetracarboxylic acid, polyacrylic acid, 1,2,3-propanetricarboxylic acid, a polycarboxylic acid polymer such as acrylic acid polymers, and maleic acid polymers.

When a catalyst is present in the composition, it is chosen as a function of the crosslinking agent in a manner well known to a person skilled in the art. Among the catalysts that can be used in the present invention, mention may be made of: the alkali metal salts of phosphorous acids such as alkali metal hypophosphites, phosphites, polyphosphonates and phosphates. Mention may also be made of alkali metal sulfonates. In the case where a urea-formol or melamine-formol resin is used as crosslinker, a preferred catalyst is $NH_4Cl$. Advantageously, the catalyst is present in an amount of 2 to 20% by weight relative to the weight of crosslinking agent.

According to one variant of the invention, the composition is prepared in two steps:

The hydrophilic compound and its crosslinking agent are firstly mixed, optionally in the presence of a catalyst, so as to obtain partial or total pre-crosslinking of the hydrophilic compound.

Next, this partially or completely pre-crosslinked hydrophilic compound is mixed with the elastomer.

Such a composition comprising:
(i) a dispersion in an aqueous solvent of at least one elastomer;
(ii) from 15 to 150% by weight relative to the weight of the elastomer of at least one partially or completely pre-crosslinked hydrophilic compound chosen from: cellulose and cellulose derivatives,
constitutes another subject of the invention.

And the invention has yet another variant that is based on a preparation of the composition also in two steps as explained above:

Such a composition comprising:
(i) a solution of at least one elastomer in an organic solvent;
(ii) from 15 to 150% by weight relative to the weight of the elastomer of at least one partially or completely pre-crosslinked hydrophilic compound chosen from: cellulose and cellulose derivatives,
constitutes another subject of the invention. The elastomers that can be used according to this variant are chosen from the list already enlarged upon above.

The organic solvent is advantageously chosen from: dimethylformamide (DMF), N,N-dimethylacetamide (DMAC), N-methylpyrrolidone (NMP), tetrahydrofuran (THF), aliphatic solvents such as n-pentane, n-hexane and n-heptane, aromatic solvents such as toluene, cycloaliphatic solvents such as cyclohexane, and mixtures thereof.

According to the latter variant, the hydrophilic compound is predispersed in a solvent chosen from those listed above.

Advantageously, the amount of hydrophilic compound by weight relative to the weight of elastomer is between 15 and 50%, more advantageously still between 15 and 40%.

Advantageously, the amount of crosslinker of the hydrophilic compound by weight relative to the weight of hydrophilic compound is between 2 and 50%, more advantageously still between 3 and 20%.

In the composition of the invention, the solids content is between 15 and 75% by weight, advantageously between 20 and 40% by weight.

Preferably, the composition of the invention comprises:
(i) a dispersion in an aqueous solvent of at least one elastomer;
(ii) from 15 to 40% by weight relative to the weight of polymer of at least one hydrophilic compound;
(iii) from 5 to 20% by weight relative to the weight of hydrophilic compound of at least one crosslinking agent of the hydrophilic compound;
(iv) from 5 to 10% by weight relative to the weight of the crosslinking agent of at least one catalyst,
and it has a solids content between 20 and 40% by weight relative to the total weight of the composition, it being understood that the hydrophilic compound may be present in partially or completely pre-crosslinked form.

The composition according to the invention may also comprise all or some of the additives customarily used in the manufacture of rubber-based articles, such as, for example, anti-aging agents, antioxidants, pigments or thickeners.

Another subject of the invention is a process for manufacturing an article by application to a mold of at least one layer of the composition of the invention, followed by a drying operation.

The mold may be constituted of any support for application of the composition, it is adapted as a function of the shape of the film that it is desired to manufacture: it may be, for example, a mold in the shape of a hand for manufacturing a glove, or in the form of a plate for manufacturing a sheet or a membrane.

The application of the composition to the mold may be carried out by any means known to a person skilled in the art such as: dip-coating, coating or spray-coating.

Preferably, the application of the composition to the mold is carried out by dip-coating for the manufacture of gloves, or by coating for the manufacture of films.

According to the process of the invention, it is possible to apply one or more layers of the composition described above, each layer being identical to or different from the other layers, with a drying step between two applications.

After application of the composition in a suitable amount to the mold, the drying operation is carried out under the following conditions: at a temperature between ambient temperature (around 20° C. in temperate regions) and 100° C., in the open air, in an oven, by the action of microwaves, or by infrared treatment.

According to the invention, it is possible to make provision for a crosslinking step after the application of the last layer. In a known manner, the crosslinking is carried out under the following conditions: by heating at a suitable temperature as a function of the elastomer and of the crosslinker, generally at a temperature between 100 and 170° C., for example by hot-air heating, in an oven. But it is also possible to make provision for crosslinking the composition by dipping into a molten salt bath.

According to the invention, it is possible to make provision for a step of washing the article after crosslinking, so as to remove the products, such as the processing aids, present in the latex and capable of being allergenic. In a known manner, this washing is carried out by dipping into an aqueous bath at a temperature between 20 and 60° C.

According to one variant of the invention, it is possible to make provision for the mold to be previously coated with a film chosen from: a textile, a non-woven fabric, or a waterproof/breathable membrane, and for the composition of the invention to be applied to this film.

According to another variant of the invention, it is possible to make provision for, after the application of one or more layers of the composition of the invention to the mold, applying a film chosen from: a textile, a non-woven fabric or a waterproof/breathable membrane to the composition.

A non-woven fabric is a manufactured sheet constituted of a web or batt of directionally or randomly orientated fibers, bonded by friction and/or cohesion and/or adhesion (standard ISO 9092 of 1998).

Among textiles, woven fabrics and knitted fabrics are included.

Preferably, when a textile, a non-woven fabric or a membrane is used for producing the article of the invention, the former is chosen from textiles, non-woven fabrics and membranes that have good elasticity properties so as to obtain an article that has satisfactory elasticity.

It is also possible, according to the invention, to make provision for the application to the mold of a layer of coagulant such as a metal salt, in particular calcium nitrate, either between two layers of the composition of the invention, or after the application of the last layer.

After the final drying and optionally the crosslinking, the article is removed from the mold.

The process of the invention may be easily carried out, according to various techniques known to a person skilled in the art:

Simple Dip-Coating:

This is the simplest process for obtaining thin depositions (layers of 10 μm after drying). A former is immersed into a bath containing the composition of the invention. The former, on which the film is deposited, is removed. This deposition is dried and if the deposited thickness is not sufficient, the operation is repeated until the desired thickness is obtained. Then the object on the former is vulcanized.

Coagulant Dip-Coating:

This is the most widely used technique. The former is dipped into a bath of coagulant and then into the composition of the invention. In this way, in a single dipping operation, a thicker deposition is obtained (100 to 200 μm after drying). The coagulant is usually a divalent metal salt. It neutralizes the protective ionized layer of polymer particles and gives rise to coagulation of the latex.

Heat-Sensitive Dip-Coating:

This is the technique for producing thick-walled parts. A bath of the composition of the invention is used that contains a heat-sensitive agent. A hot former dipped into the heat-sensitive bath makes it possible, in a single dip, to obtain the desired deposition thickness. After the dipping operation, the film is generally dried, washed and crosslinked. The film removed from the former gives an object which is the duplicate of the former.

Coating:

The coating operation consists in coating a substantially flat surface (a textile in particular). The coating is converted to a film by heat treatment. The coating may be a liquid or a paste. The preferred equipment is a (transfer) roll or a doctor blade (knife) which tangentially sweeps the surface in order to apply a defined amount of coating. In this case, the coating operation is direct.

It may be referred to as "transfer" coating in the case where the coating is first applied to another support; then the coated surface is laminated onto the final material. This technique is more particularly useful when the final support is delicate.

Spray-Coating:

Spray-coating makes it possible to deposit products without contact with the support, using a spray gun that operates by virtue of a pressurized gas, or by mechanical activation.

Another subject of the invention is an article that results from the application to a mold of at least one layer of a composition as described above, followed by a drying operation.

Optionally, this article comprises several layers of one or more compositions according to the invention.

Optionally, this article comprises at least one layer of a textile or of a non-woven fabric, or of a waterproof/breathable membrane.

Advantageously, this article comprises a waterproof/breathable film obtained according to the process of the invention having a thickness between 10 and 200 μm, advantageously from 15 to 150 μm.

The articles, and especially the gloves of the invention, have the advantage of being impermeable to water, permeable to water vapor, of being elastic and of being endowed with a good mechanical strength. Moreover, they are impermeable to aqueous solutions of surfactants, whether these are cationic, anionic or nonionic.

The term "elasticity" is understood to mean the property of being deformable under the effect of a mechanical stress and of returning to its initial shape when this mechanical stress ceases.

The articles obtained by the process of the invention advantageously have at least one, and preferably several, of the following characteristics:

vapor permeability measured according to the standard ASTM E96 method B: greater than or equal to 300 $g/m^2/24$ h;

resistance to water penetration measured according to the standard ISO 811: greater than or equal to 8000 Pa;

tensile stress-strain (standard ISO 37)

elongation at break: greater than or equal to 200%;

tension set after 100% elongation, measured according to the standard ISO 2285: less than or equal to 5%;

water penetration resistance (measured according to the standard ISO 811) after pretreatment with an abrasion test (according to the standard EN530 Method 2): greater than or equal to 8000 Pa. The abrasion test is carried out with an abrasive of grain size 240 by applying 100 cycles and a pressure on the test specimen of 9+0.2 kPa.

EXAMPLES

Example 1

Composition

|  | Parts by dry weight | Concentration of the dispersions (%) |
|---|---|---|
| Carboxylated NBR latex (***) | 100 | 48 |
| Potassium hydroxide | 0.5 | 5.0 |
| Zinc oxide | 1.5 | 53.4 |
| Sulfur | 0.85 | 50.4 |

-continued

| | Parts by dry weight | Concentration of the dispersions (%) |
|---|---|---|
| ZMBT (****) | 0.3 | 49.0 |
| Hydroxyethyl cellulose (*) | 20 | 10 |
| Melamine-formol resin (**) | 2 | 63 |
| NH$_4$Cl | 0.2 | 30 |

(*) Sold by Hercules under the reference NATROSOL 250LR
(**) Sold by Synthron under the reference PROXM3M
(***) NBR = acrylonitrile butadiene rubber
(****) ZMBT = zinc 2-mercaptobenzothiazole
Solids content of the composition = 29%

Steps of the Process

A film is produced by dip-coating of a former in the composition described above. The dip-coating is carried out a single time. Then the film is dried by heating at 50° C., then vulcanized at 170° C. A membrane is obtained that has a thickness of 60 microns.

The film obtained has the following properties:

Properties permeability to water vapor measured according to ASTM E96 method B=500 g/m$^2$/24 h;

elongation at break=500%;

tension set after 100% elongation measured according to ISO 2285≤1%; and tension set after 300% elongation ≤10%.

Example 2

Composition

| | Parts by dry weight | Concentration of the solutions |
|---|---|---|
| Self-crosslinking SBR latex (***) | 100 | 48.0 |
| Hydroxyethyl cellulose (*) | 20 | 10 |
| Melamine-formol resin (**) | 2 | 63 |
| NH$_4$Cl | 0.2 | 30 |

(*) Sold by Hercules under the reference NATROSOL ® 250LR
(**) Sold by Synthron under the reference PROXM3M
(***) SBR = styrene-butadiene rubber
Solids content = 29.8%

Steps of the Process

A film is produced by dip-coating a former in the composition described above. The dip-coating is carried out a single time. Then the film is dried by heating at 50° C., then crosslinked at 170° C. A membrane is obtained that has a thickness of 60 microns.

Properties

The film obtained has the following properties:

permeability to water vapor measured according to ASTM E96 method B=550 g/m$^2$/24 h.

Example 3

Composition

| | Parts by dry weight | Concentration of the dispersions (%) |
|---|---|---|
| Acrylic latex (Plextol ® DV245 Polymer Latex) | 100 | 55 |
| Hydroxyethyl cellulose (Natrosol ® 250 LR) | 20 | 10 |
| Maleic anhydride homopolymer (Belclène ® 200) | 2 | 50 |
| Citric acid | 0.2 | 15 |

Steps of the Process

The pH is adjusted to 2 with hydrochloric acid, a film is produced by dip-coating a former into the composition described above. The dip-coating is carried out a single time. Then the film is dried by heating at 50° C., then vulcanized at 170° C. A membrane is obtained that has a thickness of 60 microns. The film obtained has the following properties:

Properties

Permeability to water vapor measured according to ASTM E96 method B=550 g/m$^2$/24 h.

The invention claimed is:

1. A waterproof breathable film resulting from:
   applying at least one layer of a composition to a mold, the composition comprising:
   (i) a dispersion in an aqueous solvent of at least one elastomer;
   (ii) from 15 to 100% by weight relative to the weight of the elastomer of hydroxyethyl cellulose;
   (iii) from 2 to 50% by weight relative to the weight of the hydroxyethyl cellulose of at least one crosslinking agent, said crosslinking agent being a crosslinking agent of the hydroxyethyl cellulose; and
   (iv) optionally a catalyst, followed by:
   drying at a temperature between ambient temperature and 100° C., and followed by
   crosslinking after the application of the last layer at a temperature between 100 and 170° C. to generate said waterproof breathable film.

2. The waterproof breathable film as claimed in claim 1, wherein the elastomer is selected from the group consisting of natural rubbers, synthetic polyisoprenes, butadiene/acrylonitrile copolymers, butadiene/acrylonitrile/methacrylic acid ter-polymers, polychloroprenes, isoprene/isobutylene copolymers, carboxylated or non-carboxylated styrene-butadiene copolymers, polyurethanes, ethylene/vinyl acetate copolymers, acrylics, fluoroelastomers and thermoplastic elastomers, such as styrene block copolymers, thermoplastic elastomers derived from polyolefins and thermoplastic polyurethanes.

3. The waterproof breathable film as claimed in claim 1, wherein the hydroxyethyl cellulose is selected from the group consisting of cellulose ethers and esters, fibers, and fly or lint of cellulose.

4. The waterproof breathable film as claimed in claim 1, wherein the crosslinker of the hydroxyethyl cellulose is selected the group consisting of dimethyloldihydroxyethyleneurea (DMDHEU), N-methylolacrylamide (NMA), melamine-formol resins, urea-formol resins, polyamide-epichlorohydrin (PAE) resins, polycarboxylic acids, and a carboxylic acid polymer.

5. The waterproof breathable film as claimed in claim 1, wherein the amount of crosslinker of the hydroxyethyl cellulose by weight relative to the weight of the hydroxyethyl cellulose is between 3 and 20%.

6. The waterproof breathable film as claimed in claim 1, wherein the amount of the hydroxyethyl cellulose by weight relative to the weight of elastomer is between 15 and 50%.

7. The waterproof breathable as claimed in claim 1, wherein the solids content of the composition is between 15 and 75% by weight.

8. A process for manufacturing a waterproof breathable article, comprising:
    applying at least one layer of a composition to a mold the composition comprising:
    (i) a dispersion in an aqueous solvent of at least one elastomer;
    (ii) from 15 to 100% by weight relative to the weight of the elastomer of hydroxyethyl cellulose;
    (iii) from 2 to 50% by weight relative to the weight of the hydroxyethyl cellulose of at least one crosslinking agent, the crosslinking agent being a crosslinking agent of the hydroxyethyl cellulose; and
    (iv) optionally a catalyst, followed by
        drying at a temperature between ambient temperature and 100° C., and followed by
        crosslinking after the application of the as last layer a temperature between 100 and 170° C. to generate said waterproof breathable article.

9. The process for manufacturing an article as claimed in claim 8, wherein the mold has the shape of a hand and the article is a glove.

10. The process for manufacturing an article as claimed in claim 8, wherein applying the composition to the mold is carried out by dip-coating.

11. The process for manufacturing an article as claimed in claim 8, wherein, prior to the application of the composition, the mold is coated with a film selected from the group consisting of a textile, a non-woven fabric and a waterproof breathable membrane.

12. The process for manufacturing an article as claimed in claim 8, wherein after the application of one or more layers of the composition to the mold, a film selected from the group consisting of a textile, a non-woven fabric, and a waterproof breathable membrane is applied to the composition.

13. The process for manufacturing an article as claimed in claim 8, wherein the process comprises the application of a layer of coagulant to the mold or between two layers, or after the application of the last layer of the composition.

14. An article resulting from the process of claim 8.

15. An article obtained according to the process as claimed in claim 8, comprising a waterproof breathable film having a thickness between 10 and 200 μm.

16. The article as claimed in claim 14, wherein the article comprises a waterproof breathable film which meets at least one of the following properties:
    vapor permeability measured according to the standard ASTM E96 method B: greater than or equal to 300 g/m2/24 h;
    resistance to water penetration measured according to the standard ISO 811: greater than or equal to 8000 Pa;
    tensile stress-strain (standard ISO 37) elongation at break: greater than or equal to 200%;
    tension set after 100% elongation, measured according to the standard ISO 2285: less than or equal to 5%;
    water penetration resistance (measured according to the standard ISO 811) after pretreatment with an abrasion test (according to the standard EN530 Method 2): greater than or equal to 8000 Pa (the abrasion test is carried out with an abrasive of grain size 240 by applying 100 cycles and a pressure on the test specimen of 9+0.2 kPa).

* * * * *